US 8,744,645 B1

(12) United States Patent
Vaghefinazari et al.

(10) Patent No.: US 8,744,645 B1
(45) Date of Patent: Jun. 3, 2014

(54) SYSTEM AND METHOD FOR INCORPORATING GESTURE AND VOICE RECOGNITION INTO A SINGLE SYSTEM

(71) Applicants: Pedram Vaghefinazari, Long Beach, CA (US); Stuart Yamamoto, Hacienda Heights, CA (US); Tarek El Dokor, Phoenix, AZ (US); Josh Tyler King, Phoenix, AZ (US)

(72) Inventors: Pedram Vaghefinazari, Long Beach, CA (US); Stuart Yamamoto, Hacienda Heights, CA (US); Tarek El Dokor, Phoenix, AZ (US); Josh Tyler King, Phoenix, AZ (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/777,255

(22) Filed: Feb. 26, 2013

(51) Int. Cl.
*G06F 17/00* (2006.01)
*G06F 3/01* (2006.01)
*G06F 3/16* (2006.01)
*G06F 3/038* (2013.01)

(52) U.S. Cl.
CPC ............... *G06F 3/017* (2013.01); *G06F 3/167* (2013.01); *G06F 3/038* (2013.01)
USPC .......................................................... 701/1

(58) Field of Classification Search
CPC .......... G06F 3/017; G06F 3/038; G06F 3/167
USPC .......................................................... 701/1
See application file for complete search history.

(56) References Cited

U.S. PATENT DOCUMENTS

| | | | |
|---|---|---|---|
| 6,243,683 B1 | 6/2001 | Peters | |
| 6,624,833 B1 | 9/2003 | Kumar et al. | |
| 6,792,339 B2 * | 9/2004 | Basson et al. | 701/1 |
| 6,804,396 B2 | 10/2004 | Higaki et al. | |
| 7,321,854 B2 | 1/2008 | Sharma et al. | |
| 7,665,041 B2 | 2/2010 | Wilson et al. | |
| 8,095,291 B2 * | 1/2012 | Christen et al. | 701/102 |
| 8,111,239 B2 * | 2/2012 | Pryor et al. | 345/156 |
| 8,303,405 B2 * | 11/2012 | Zalewski et al. | 463/30 |
| 8,627,096 B2 * | 1/2014 | Azar et al. | 713/186 |
| 8,630,768 B2 * | 1/2014 | McClellan et al. | 701/36 |
| 2002/0036617 A1 * | 3/2002 | Pryor | 345/156 |
| 2009/0150160 A1 | 6/2009 | Mozer | |
| 2009/0278915 A1 | 11/2009 | Kramer et al. | |
| 2011/0022393 A1 | 1/2011 | Waller et al. | |
| 2011/0106375 A1 * | 5/2011 | Gurusamy Sundaram | 701/33 |
| 2012/0050685 A1 * | 3/2012 | Bartlett et al. | 351/223 |
| 2013/0103196 A1 * | 4/2013 | Monceaux et al. | 700/253 |
| 2013/0166286 A1 * | 6/2013 | Matsumoto | 704/205 |
| 2013/0179034 A1 * | 7/2013 | Pryor | 701/36 |
| 2013/0204484 A1 * | 8/2013 | Ricci | 701/29.4 |
| 2013/0290002 A1 * | 10/2013 | Togawa et al. | 704/275 |

OTHER PUBLICATIONS

Gizmag Team, "Honda to show auto navigation and multimedia system with gesture recognition," Jan. 13, 2010, three pages. [Online] [Retrieved Jul. 5, 2011] Retrieved from the Internet <URL: http://www.gizmag.com/honda-to-show-auto-navigation-and-multimedia-system-with-gesture-recognition/13867/.>.

(Continued)

*Primary Examiner* — Thomas Tarcza
*Assistant Examiner* — Alex C Dunn
(74) *Attorney, Agent, or Firm* — Fenwick & West LLP (57) ABSTRACT

A system and method for combining two separate types of human machine interfaces, e.g., a voice signal and a gesture signal, performing voice recognition to a voice signal and gesture recognition to the gesture signal. Based on a confidence determination using the voice recognition result and the gesture recognition result the system can, for example, immediately perform the command/request, request confirmation of the command/request or determine that the command/request was not identified.

22 Claims, 5 Drawing Sheets

(56) References Cited

OTHER PUBLICATIONS

Muller, C. et al., "Multimodal Input in the Car, Today and Tomorrow," *Industry and Standards: Mitsubishi Electric Research Labs, IEEE Computer Society*, Jan. 2011, pp. 98-103.

Pickering, C., "The Search for a Safer Driver Interface: a review of gesture recognition Human Machine Interface," IEE Computing & Control Engineering, Feb./Mar. 2005, pp. 34-40.

Reissner, U., "Gestures and Speech in Cars," Date Unknown, twelve pages. [Online] [Retrieved Jul. 5, 2011] Retrieved from the Internet <URL: http://www14.informatik.tu-muenchen.de/konferenzen/Jass07/courses/3/3_Gestures-and-Speech-in-Cars_Report.pdf.>.

Whitfield, K., "Gesture Interfaces for Automotive Control: (Beyond Digital Expletives)," *Automotive Design & Production*, Jul. 2003, vol. 115, Issue 7, three pages. [Online] [Retrieved Jul. 5, 2011] Retrieved from the Internet <URL: http://66.192.79.249/articles/070307.html.>

* cited by examiner

Figure 2

|  | GR Score | VR Score | Decision |
| --- | --- | --- | --- |
| Case 1 | >=T3 | >=T4 | Execute command |
| Case 2 | <T3 | >=T4 | Confirmation requested |
| Case 3 | >=T3 | <T4 | Confirmation requested |
| Case 4 | <T3 | <T4 | Command not recognized |

Figure 4

| | GR Score Command X | VR Score Command Y | Decision |
|---|---|---|---|
| Case 1 | >=T3 | >=T4 | Ask user, Do you want to perform X or Y |
| Case 2 | <T3 | >=T4 | Ask user for confirmation to perform Y |
| Case 3 | >=T3 | <T4 | Ask user for confirmation to perform X |
| Case 4 | <T3 | <T4 | Command not recognized |

Commands X and Y Differ

Figure 5

SYSTEM AND METHOD FOR INCORPORATING GESTURE AND VOICE RECOGNITION INTO A SINGLE SYSTEM

FIELD OF THE INVENTION

This application relates to gesture and voice recognition systems and more particularly to gesture and voice command recognition in a vehicle.

BACKGROUND

Human machine interfaces (HMIs) are common in many consumer devices and vehicles. A problem with conventional systems is that human machine interfaces are limited in the ability to recognize a user's command/request based on, for example a voice signal or visual signal. A more robust HMI and command/request recognition system is needed.

SUMMARY

A system and method for combining two separate types of human machine interfaces, e.g., a voice signal and a gesture signal, and performing voice recognition to a voice signal and gesture recognition to the gesture signal. Based on a confidence determination using the voice recognition result and the gesture recognition result the system can, for example, immediately perform the command/request, request confirmation of the command/request or determine that the command/request was not identified.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter. For example, while the use in a vehicle is set forth herein as an example for ease of discussion, the present invention is not limited to use in a vehicle

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Embodiments are now described with reference to the figures where like reference numbers indicate identical or functionally similar elements. Also in the figures, the left most digit of each reference number corresponds to the figure in which the reference number is first used.

Figure 1:
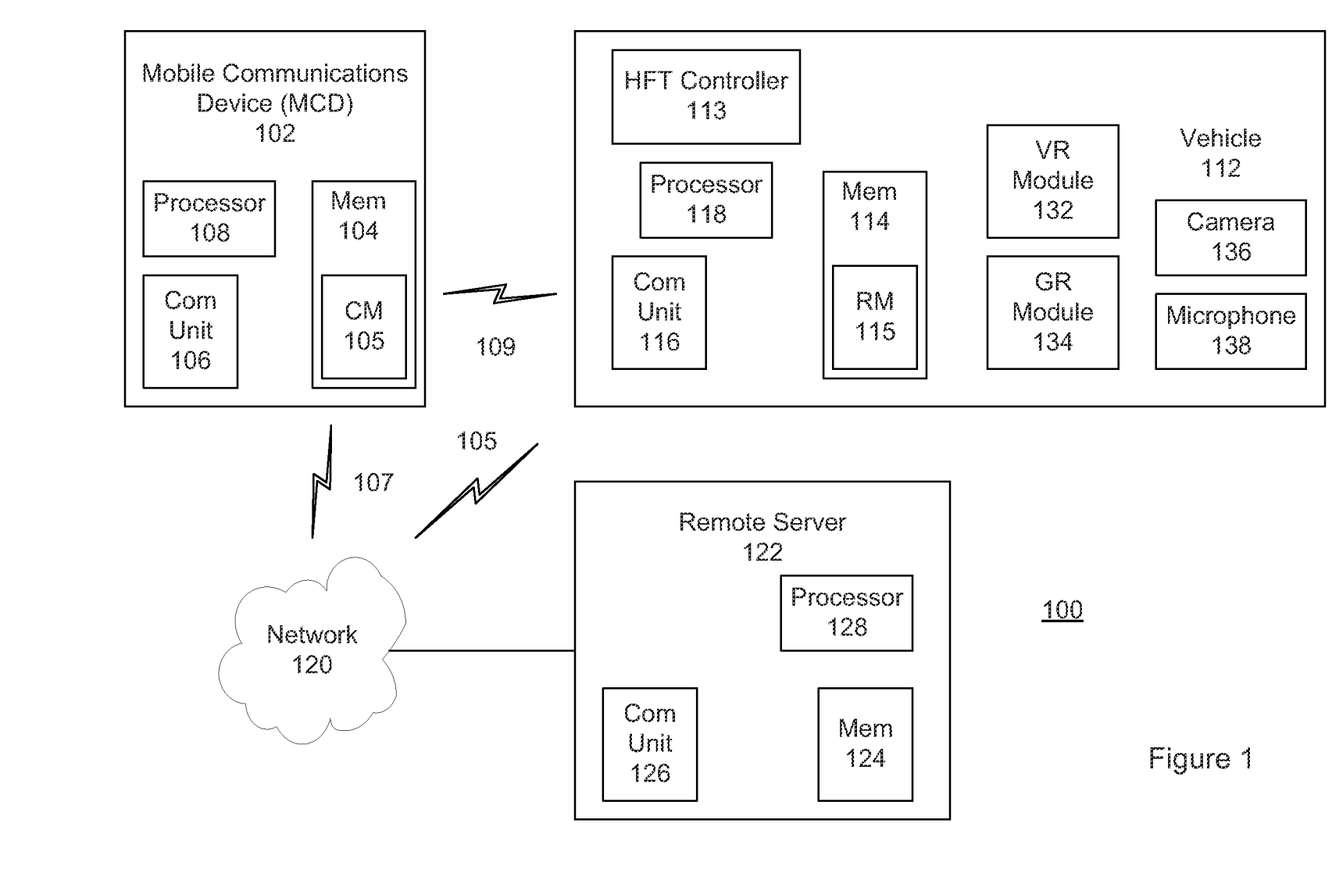
FIG. 1 is an illustration of an environment in which one embodiment may operate.

FIG. 1 illustrates an exemplary operating environment 100 for various embodiments. Operating environment 100 may include an in-vehicle communications system, one example of such a system is an in-vehicle hands free telephone (HFT) controller 113 which will be used as an example herein for ease of discussion. The operating environment 100 may also include a wireless mobile communication device (MCD) 102, a communication link 105 for communications between the in-vehicle system 112 and a network 120, a short-range communication link 109 for communication between the in-vehicle system 112 and wireless mobile communication device 102, a wireless networking communication link 107 between wireless mobile communication device 102 and network 120, and a processing device, such as a server 122 connected to network 120. The communication links described herein can directly or indirectly connect these devices. The network 120 can be a wireless communication network such as a cellular network comprised of multiple base stations, controllers, and a core network that typically includes multiple switching entities and gateways, for example.

The vehicle 112 can include a camera 136, a microphone 138, a voice recognition (VR) module 132 and/or a gesture recognition (GR) module 134. The camera 136 and/or microphone can be in the vehicle 112 or can be in the MCD 102 (not shown), for example. In an embodiment the camera 136 can be any optical sensing device, for example, a sensor that captures signals from within the vehicle, e.g., a time of flight camera, an infrared sensor, a traditional camera, CMOS type sensor cameras, etc. The camera 136 is positioned to receive signals from a user such as hand signals from a driver or passenger. In various embodiments, the signals received by the camera 136 represent gestures by a driver/passenger. The camera 136 can include multiple cameras 136 positioned to receive signals from various positions in the vehicle, e.g., driver seat, front passenger seat, second row seats, etc. Alternatively a single camera can be used which is focused on one position, e.g., the driver, has a wide field of view and can receive signals from more than one occupant of the vehicle, or can change its field of view to receive signals from different occupant positions. In another embodiment, the camera 136 is positioned in the MCD 102, e.g., a camera incorporated into a smart phone, and the camera can be positioned to capture the gestures by the occupant. For example, the camera 136 can be mounted so that it faces the driver and can capture gestures by the driver. The camera 136 may be positioned in the cabin or pointing toward the cabin and can be mounted on the ceiling, headrest, dashboard or other locations in/on the vehicle 112 or MCD 102.

The vehicle can include a microphone 138 that receives audio signals from inside the vehicle. In an embodiment the microphone can be positioned such that it is more sensitive to sound emanating from a particular position, e.g., the position of the driver, than other positions, e.g., other occupants. The microphone 138 can be standard microphone that is incorporated into a vehicle or can be a microphone incorporated into a MCD 102. The microphone 138 can be mounted so that it receives voice signals from the driver. For example, the microphone 138 may be positioned in the cabin or pointing toward the cabin and can be mounted on the ceiling, headrest, dashboard or other locations in/on the vehicle 112 or MCD 102.

In the embodiment illustrated in FIG. 1, the vehicle includes a voice recognition module 132 and a gesture recognition module 136. The voice recognition module 132 can include software that receives an output signal of the microphone 138 and performs a voice recognition algorithm on the received signal to identify the word or words received by the microphone 138. In alternate embodiments, the voice recognition module 132 is positioned external to the vehicle 132, for example the voice recognition module can be positioned in the MCD 102 or a remote server 122. For example, the voice recognition module 132 can be an application downloaded to the MCD 102, e.g., an application available from iTunes. The gesture recognition module 134 can include software that receives an output signal of the camera 138 and performs a gesture recognition algorithm on the received signal to identify/interpret the gesture received by the camera 136. In alternate embodiments, the gesture recognition module 134 is positioned external to the vehicle 132, for example the gesture recognition module 134 can be positioned in the MCD 102 or a remote server 122. For example, the gesture recognition module 134 can be an application downloaded to the MCD 102, e.g., an application available from iTunes.

In-vehicle hands free telephone (HFT) controller 113 and wireless mobile communication device 102 may communicate with each other via a short-range communication link 109 which uses short-range communication technology, such as, for example, Bluetooth® technology or other short-range communication technology, for example, Universal Serial Bus (USB). In-vehicle HFT controller system 113 and wireless mobile communication device 102 may connect, or pair, with each other via short-range communication link 109. In an embodiment the HFT controller 113 can include a communications unit 116 to assist in the short-range communications, a memory unit device 114, and a processor 118. The HFT controller 113 can be part of a vehicle's telematics system, which includes memory/storage, processor(s) and communication unit(s). FIG. 1 shows the memory 114, communication unit 116 and processor 118 as being part of the in-vehicle HFT controller 113 for ease of discussion. In alternate embodiments the HFT controller 113 can utilize the vehicle's telematics unit to assist in performing various functions. For example the communications unit 116 and/or processor 118, for example, can be part of the vehicle's telematics unit or can be a separate unit in the vehicle. The MCD 102 has an operating system and can include various applications either integrated into the operating system or stored in memory/storage 104 and executed by the processor 108.

Processors 108, 118 and/or 128 process data signals and may comprise various computing architectures including a complex instruction set computer (CISC) architecture, a reduced instruction set computer (RISC) architecture, or an architecture implementing a combination of instruction sets. Although only a single processor is shown in FIG. 1, multiple processors may be included. The processors can comprises an arithmetic logic unit, a microprocessor, a general purpose computer, or some other information appliance equipped to transmit, receive and process electronic data signals from the memory 104, 114, 124, and other devices both shown and not shown in the figures.

Examples of a wireless mobile communication device (MCD) 102 include a cellular phone, personal device assistant (PDA), smart phone, pocket personal computer (PC), laptop computer, tablet computer, smart watch or other devices having a processor, communications capability and are easily transportable, for example. In a common form, an MCD application can be part of a larger suite of vehicle features and interactions. Examples of applications include applications available for the iPhone™ that is commercially available from Apple Computer, Cupertino, Calif., applications for phones running the Android™ operating system that is commercially available from Google, Inc., Mountain View, Calif., applications for BlackBerry devices, available from RIM, Ontario Canada, and/or applications available for Windows Mobile devices, available from Microsoft Corp., Redmond, Wash. In an embodiment the MCD 102 includes a communications unit 106 a memory unit device 104, and a processor 108. The MCD 102 has an operating system and can include various applications either integrated into the operating system or stored in memory/storage 104 and executed by the processor 108.

In alternate embodiments a mobile communication device 102 can be used in conjunction with a communication device embedded in the vehicle, such as a vehicle embedded phone, a wireless network card or other device (e.g., a Wi-Fi capable device). For ease of discussion the description herein describes the operation of the embodiments with respect to an embodiment using a mobile communication device 102. However, this is not intended to limit the scope of the embodiments and it is envisioned that other embodiments operate using other communication systems between the in-vehicle system 112 and the network 120, examples of which are described herein.

In-vehicle system 112 may send information to wireless mobile communication device 102. Wireless mobile communication device 102 may send information to in-vehicle system 112 via short-range communication link 109. Wireless mobile communication device 102 may store information received from in-vehicle system 112, and/or may provide the information (such as voice and/or gesture signals) to a remote processing device, such as, for example, server 122, via network 120. Remote server 122 can include a communications unit 126 to connect to the network 120, for example, a memory/storage unit 124 and a processor 128.

In some embodiments, in-vehicle system 112 may provide information to the wireless mobile communication device 102. Wireless mobile communication device 102 may use that information to obtain additional information from network 120 and/or server 122. The additional information may also be obtained in response to providing information with respect to a prompt on wireless mobile communication device 102 from in-vehicle system 112.

Network 120 may include a wireless communication network, for example, a cellular telephony network, as well as one or more other networks, such as, the Internet, a public-switched telephone network (PSTN), a packet-switching network, a frame-relay network, a fiber-optic network, and/or other types of networks.

Figure 2:
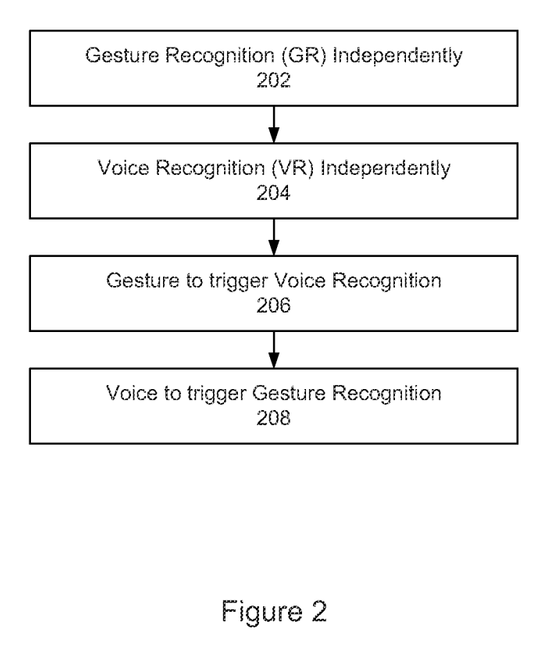
FIG. 2 is an illustration of various embodiments for activating a voice recognition system and a gesture recognition system.

FIG. 2 is an illustration of various embodiments for activating a voice recognition system and a gesture recognition system. A driver can interact with a gesture recognition module 134 and/or a voice recognition module 132 in a variety of ways.

In an embodiment, the user, e.g., a vehicle driver or passenger, interacts 202 with the gesture recognition (GR) module 134 independently of the voice recognition module 136. In this embodiment, the gesture recognition module 134 enables the driver to enter into different modes, such as, navigation, hands-free calling, music search, etc.

In another embodiment, the driver (or passenger) interacts 204 with the voice recognition (VR) module 136 independently of the gesture recognition module 134. In this embodiment the user may, for example, say a command which takes the voice recognition system into a particular mode or context, such as, navigation, web search, hands-free calling, music search, etc. The system may require the pressing of a talk switch or some other method of waking up/activating the voice recognition module 132 and/or microphone 138 (together the voice recognition system). In some embodiments, the voice recognition system supports an open microphone in which the system wakes-up when the user uses a specific word.

In another embodiment, the driver (or passenger) interacts 206 with the gesture recognition (GR) module 134 to trigger the voice recognition module 136. In one example of this embodiment the user may make a gesture that represents a phone, e.g., by gesturing the shape of a phone or a gesture that is interpreted as making a phone call, e.g., placing a hand near an ear with the thumb and pinky extended. The system takes the user to the phone mode and enables/opens the voice recognition system (VR module 132 and microphone 138) which allows the microphone 138 to receive and act upon a voice signal, e.g., a command, spoken by a user. In alternate embodiments, a voice prompt (informative or confirmative) may occur before enabling the voice recognition system.

In another embodiment, the driver (or passenger) interacts 208 with the voice recognition (VR) module 136 to trigger the gesture recognition module 134. In one example of this embodiment the user may speak a trigger word or phrase, e.g., "music." The system can then go into a music mode and the user can scroll through album covers displayed in a vehicle's display device by performing a gesture interpreted to mean "scroll." In an alternate embodiment, a voice prompt (informative or confirmative) may occur before enabling the gesture recognition system.

In some embodiments the four methods of recognitions 202, 204, 206, 208 can alternate so that one method is active at a given time. In such a system, the user should follow the proper sequence to perform a desired task. In other embodiments, more than one method can be enabled simultaneously which provides additional flexibility to the user in having the desired task performed.

Figure 3:
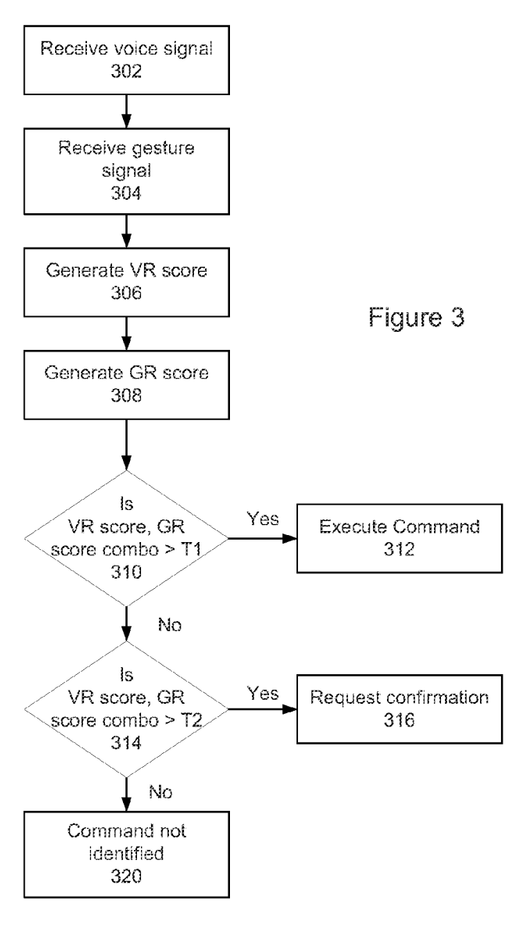
FIG. 3 is a flowchart of a method in accordance with one embodiment.

FIG. 3 is a flowchart of a method in accordance with one embodiment. The embodiments can operate using any of the four methods of recognition 202, 204, 206, 208 described above. In this embodiment, a microphone 138 receives 302 a voice signal from a user in a vehicle. A camera 136 receives 304 a gesture signal. These two events can occur simultaneously or sequentially in any order.

The voice recognition module 132 performs a conventional voice recognition algorithm and in one embodiment generates 306 a voice recognition score. In an embodiment a voice recognition score can represent a confidence level that the output of the voice recognition module 132 correctly matches the command represented by the voice command, e.g., a score of 90 can represent a 90 percent confidence value that the recognized phrase is correct.

The gesture recognition module 134 performs a gesture recognition algorithm and in one embodiment generates 308 a gesture recognition score. Any well-known gesture recognition algorithm may be employed. For example, one or more Markov models for dynamic gestures, Support Vector Machines for static gestures, and the like may be employed. Indeed any gesture recognition algorithm that interprets input gestures and provides a recognition score indicative of a level of confidence may be employed. In an embodiment a gesture recognition score can represent a confidence level that the output of the gesture recognition module 134 correctly matches the command represented by the gesture signal, e.g., a score of 90 can represent a 90 percent confidence value that the recognized gesture is correct. Steps 306 and 308 can be performed simultaneously or sequentially in any order.

In an embodiment, the gesture score and voice scores may be weighted. Alternatively, the system and method may use trained action units that are capable of defining the relationship itself. Ideally, a learning system will choose between the two modalities, or choose combining them, as well as combining other modalities such as touch. Additional details about techniques involving such recognition are known, e.g., in Pattern Classification, 2nd edition by Duda, Hart and Stork, which is incorporated by reference herein in its entirety.

In one embodiment, the recognition module 115 receives the voice recognition score and the gesture recognition score for the top one or more recognized strings, phrases, etc, and, in one embodiment, determines a combined recognition score based on the voice recognition score and the gesture recognition score for the top one or more recognized phrases. The phrase/command associated with combined recognitions score(s) is the "identified command."

In one embodiment, the recognition module 115 receives the voice recognition score and the gesture recognition score for the top one or more recognized phrases and, in one embodiment, determines the phrase/command with the highest combined score (the "identified command"). As described below, in alternate embodiments, scores related to different commands/phrases can be identified. For the identified command the system determines 310 whether the combination of the scores exceeds a first threshold (T1). If 310 the combination exceeds a first threshold then it is determined that the recognized phrase/command is correct and the phrase/command is executed 312. For example, in an embodiment the voice recognition score and the gesture recognition score are combined, such as a summing of the two scores, although many other arithmetic factors/equations can be used, and if the total exceeds the first threshold then it's determined that the phrase/command is correct and the command is executed 312.

If 310 the system determines that the combination of the voice recognition score and gesture recognition score for the phrase/command does not exceed a first threshold but is above 314 a second threshold (T2) then the system requests confirmation 316 from the user. The confirmation can be in various formats, such as one or more of a verbal signal, a visual signal, and/or a tactile signal, for example. The confirmation may require the user to actively confirm that the identified phrase/command is correct or can provide the user with the identified phrase/command and execute the command unless the user indicates that the phrase/command is incorrect.

If 314 the system determines that the combination of the voice recognition score and gesture recognition score for the phrase/command does not exceed the second threshold then the system determines that the identified command is not recognized 320 at a high enough confidence level to proceed. In an embodiment the system requests that the user to repeat the command.

Figure 4:
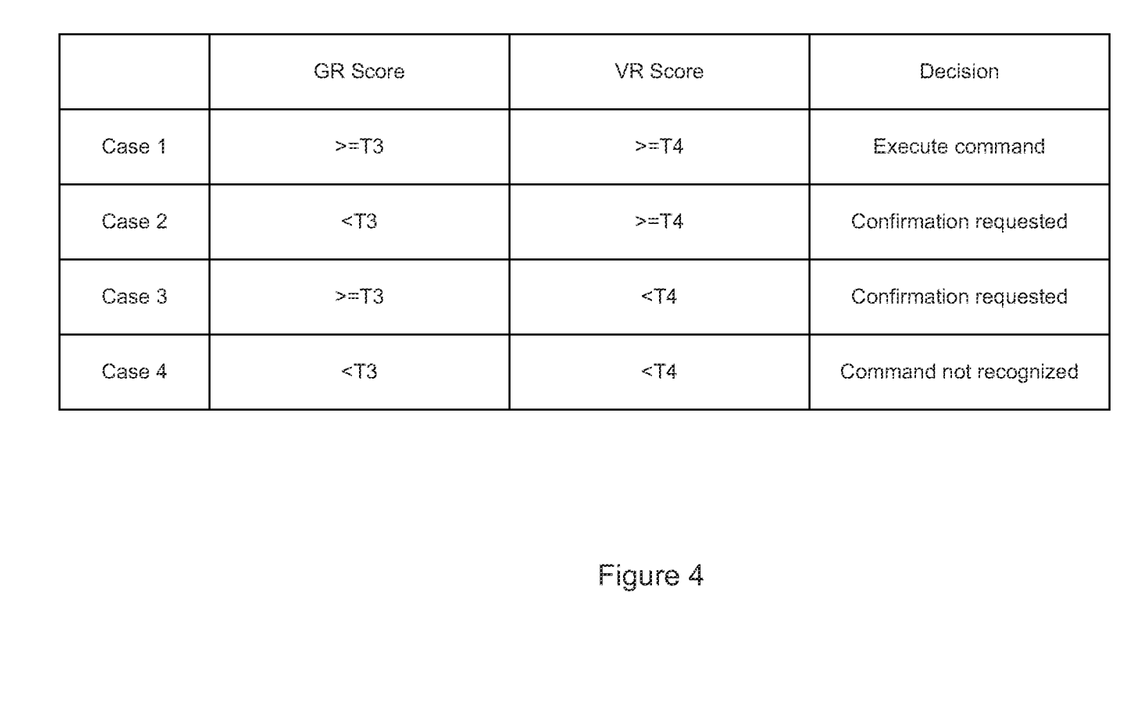
FIG. 4 is an illustration setting forth an example of the effect of a gesture recognition score and a voice recognition score when the commands are in the same domain in accordance with one embodiment.

FIG. 4 is an illustration setting forth an example of the effect of a gesture recognition score and a voice recognition score when the commands are in the same domain in accordance with one embodiment. In the example set forth in FIG. 4, four cases are set forth based on a values of the gesture recognition score and voice recognition score. This is another embodiment that performs steps similar to steps 310-316 in FIG. 3. In Case 1, if the gesture recognition score exceeds a threshold (T3) and the voice recognition score exceeds a threshold (T4) then the system executes the command.

In Case 2, if the gesture recognition score does not exceed threshold T3 but the voice recognition score exceeds threshold T4 then the system requests confirmation of the identified phrase/command from the user.

In Case 3, if the gesture recognition score exceeds threshold T3 but the voice recognition score does not exceed threshold T4 then the system requests confirmation of the identified phrase/command from the user.

In Case 4, if the gesture recognition score does not exceed threshold T3 and the voice recognition score does not exceed threshold T4 then the system determines that the phrase/command was not recognized. In an embodiment the system requests that the user repeat the command.

In embodiments, the threshold values T3 and T4 can be the same, while in other embodiments they are different. In addition, additional thresholds, e.g., T5, T6 etc. can be used when determining whether the phrase/command is properly identified based upon the voice recognition score and the gesture recognition score. For example, additional threshold comparisons may be done based on different thresholds, e.g., T5, T6 so that in Case 2, if the gesture recognition score is below T3 but is above T5 then the confirmation requested is one where the vehicle will perform the command unless the user indicates that the identified command is incorrect. However if the gesture recognition score is also below T3 and T5 (with the Voice recognition score still being above T4) then the vehicle may request that the user affirmatively confirm the identified phrase/command before the command is executed. Examples of such a confirmation include pressing a button, performing a gesture, speaking or a combination thereof.

In alternate embodiments, if the gesture recognition score is below a threshold, e.g., threshold T6, or the voice recognition score below a threshold, e.g., threshold T6 or a different threshold T7, then the system will determine that the command is not recognized.

Figure 5:
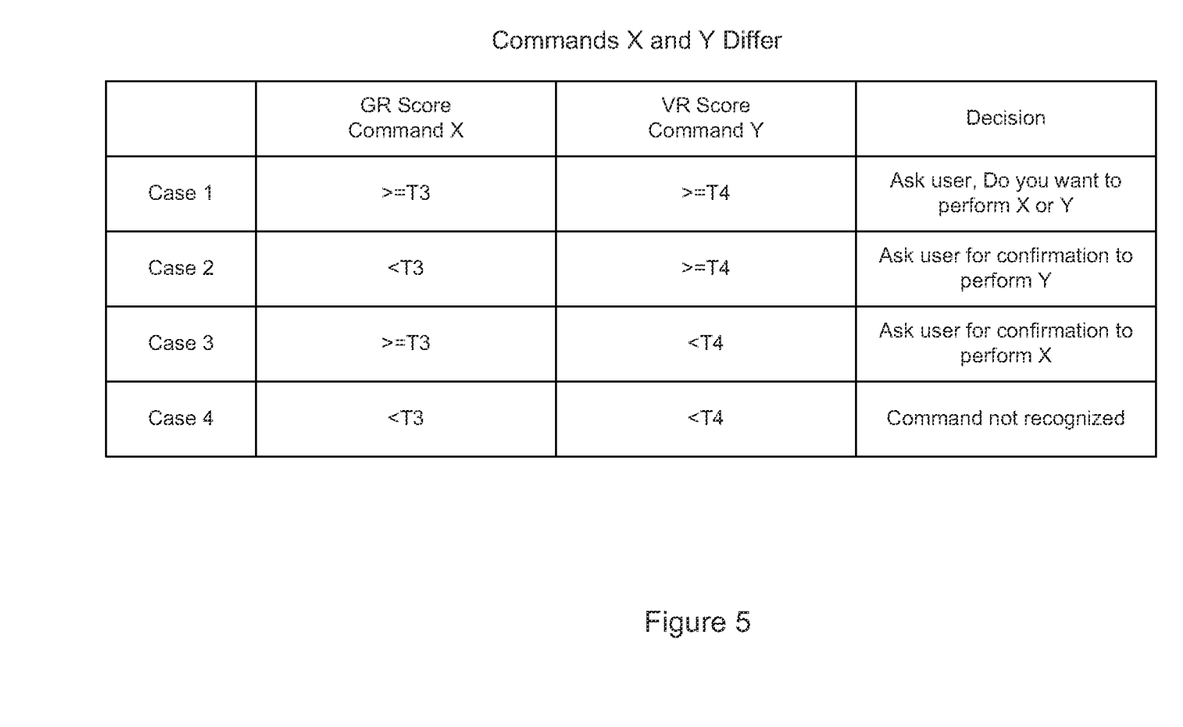
FIG. 5 is an illustration setting forth an example of the effect of a gesture recognition score and a voice recognition score when the command with the highest voice recognition score differs from the command with the highest gesture recognition score in accordance with one embodiment.

FIG. 5 is an illustration setting forth an example of the effect of a gesture recognition score and a voice recognition score when the command with the highest voice recognition score differs from the command with the highest gesture recognition score in accordance with one embodiment. Note that the threshold values (T3, T4) are not necessarily the same as those described above with respect to FIG. 4. In the examples set forth above the phrase/command with the best combined score was compared. Alternatively the best voice recognition score and the best gesture recognition score were both associated with the same phrase/command. In an alternate embodiment, phrase/command receiving the highest voice recognition command are different.

In Case 1, if the gesture recognition score for phase/command "X" is above threshold T3 and the voice recognition score for phrase/command "Y" is above threshold T4 (which may be the same or different than T3) then the system queries the user regarding whether the user wants to perform command X or Y.

In Case 2, if the gesture recognition score for phase/command "X" is below threshold T3 and the voice recognition score for phrase/command "Y" is above threshold T4 then the system queries the user to confirm that the user wants to perform command Y.

In Case 3, if the gesture recognition score for phase/command "X" is above threshold T3 and the voice recognition score for phrase/command "Y" is below threshold T4 then the system queries the user to confirm that the user wants to perform command X.

In Case 4, if the gesture recognition score for phase/command "X" is below threshold T3 and the voice recognition score for phrase/command "Y" is below threshold T4 then the system determines that it has not found a match and may ask the user to try again.

Reference in the specification to "one embodiment" or to "an embodiment" means that a particular feature, structure, or characteristic described in connection with the embodiments is included in at least one embodiment. The appearances of the phrase "in one embodiment" or "an embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations or transformation of physical quantities or representations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device (such as a specific computing machine), that manipulates and transforms data represented as physical (electronic) quantities within the computer system memories or registers or other such information storage, transmission or display devices.

Certain aspects of the embodiments include process steps and instructions described herein in the form of an algorithm. It should be noted that the process steps and instructions of the embodiments can be embodied in software, firmware or hardware, and when embodied in software, could be downloaded to reside on and be operated from different platforms used by a variety of operating systems. The embodiments can also be in a computer program product, which can be executed on a computing system.

The embodiments also relate to an apparatus for performing the operations herein. This apparatus may be specially constructed for the purposes, e.g., a specific computer, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Memory can include any of the above and/or other devices that can store information/data/programs and can be transient or non-transient medium, where a non-transient or non-transitory medium can include memory/storage that stores information for more than a minimal duration. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the method steps. The structure for a variety of these systems will appear from the description herein. In addition, the embodiments are not described with reference to any particular programming language. It will be appreciated that a variety of programming languages may be used to implement the teachings of the embodiments as described herein, and any references herein to specific languages are provided for disclosure of enablement and best mode.

In addition, the language used in the specification has been principally selected for readability and instructional purposes, and may not have been selected to delineate or circumscribe the inventive subject matter. Accordingly, the disclosure of the embodiments is intended to be illustrative, but not limiting, of the scope of the embodiments, which is set forth in the claims.

While particular embodiments and applications have been illustrated and described herein, it is to be understood that the embodiments are not limited to the precise construction and components disclosed herein and that various modifications, changes, and variations may be made in the arrangement, operation, and details of the methods and apparatuses of the embodiments without departing from the spirit and scope of the embodiments as defined in the appended claims.

What is claimed is:

1. A computer based method for executing a command in a vehicle, comprising the steps of:
   receiving a voice signal;
   receiving a gesture signal;
   performing a voice recognition procedure to generate a voice recognition (VR) score representing a likelihood that the voice signal corresponds to a first voice command;
   performing a gesture recognition procedure to generate a gesture recognition (GR) score representing a likelihood that the gesture signal corresponds to a first gesture command; and
   executing a first command in a vehicle corresponding to said first voice command and first gesture command when said voice recognition score exceeds a first threshold and said gesture recognition score exceeds a second threshold.

2. The method of claim 1, further comprising the step of:
   generating a confirmation request, prior to executing said first command, when either (a) said voice recognition score exceeds a first threshold and said gesture recognition score does not exceed a second threshold or (b) said voice recognition score does not exceed a first threshold and said gesture recognition score exceeds a second threshold.

3. The method of claim 2, further comprising the step of:
   not executing a command corresponding to said first voice command or said first gesture command when said voice recognition score does not exceed a first threshold and said gesture recognition score does not exceed a second threshold.

4. The method of claim 1, wherein said confirmation request is at least one of an audible request and a visual request.

5. The method of claim 1, further comprising the step of:
   not executing a command corresponding to said first voice command or said first gesture command when said voice recognition score does not exceed a first threshold and said gesture recognition score does not exceed a second threshold.

6. A computer based method for executing a command in a vehicle, comprising the steps of:
   receiving a voice signal;
   receiving a gesture signal;
   performing a voice recognition procedure to generate a voice recognition (VR) score representing a likelihood that the voice signal corresponds to a first voice command;
   performing a gesture recognition procedure to generate a gesture recognition (GR) score representing a likelihood that the gesture signal corresponds to a first gesture command;
   generating a combined recognition score based on a combination of said VR score and said GR score; and
   executing a first command in the vehicle corresponding to at least one of said first voice command and said first gesture command when said combined recognition score exceed a first threshold.

7. The method of claim 6, further comprising the step of:
   generating a confirmation request, prior to executing said first command, when said combined recognition score does not exceed a second threshold.

8. The method of claim 7, wherein said first and second thresholds are substantially the same.

9. The method of claim 6, wherein said confirmation request is at least one of an audible request and a visual request.

10. The method of claim 6, wherein said voice signal and gesture signal are received in a vehicle.

11. The method of claim 6, wherein said step of performing said gesture recognition procedure is performed in a mobile communication device.

12. The method of claim 11, wherein said mobile communication device is one of a cellular phone, a personal device assistant, a smart phone, a pocket personal computer, a laptop computer, a tablet computer, or a smart watch.

13. A non-transitory computer readable medium comprising computer executable code which when executed by a computer performs the steps of:
   receiving a voice signal;
   receiving a gesture signal;
   performing a voice recognition procedure to generate a voice recognition (VR) score representing a likelihood that the voice signal corresponds to a first voice command;
   performing a gesture recognition procedure to generate a gesture recognition (GR) score representing a likelihood that the gesture signal corresponds to a first gesture command;
   executing a first command in a vehicle corresponding to said first voice command and first gesture command when said voice recognition score exceeds a first threshold and said gesture recognition score exceeds a second threshold.

14. The computer readable medium of claim 13, further comprising the step of:
   generating a confirmation request, prior to executing said first command, when either (a) said voice recognition score exceeds a first threshold and said gesture recognition score does not exceed a second threshold or (b) said voice recognition score does not exceed a first threshold and said gesture recognition score exceeds a second threshold.

15. The computer readable medium of claim 14, further comprising the step of:
   not executing a command corresponding to said first voice command or said first gesture command when said voice recognition score does not exceed a first threshold and said gesture recognition score does not exceed a second threshold.

16. The computer readable medium of claim 13, wherein said confirmation request is at least one of an audible request and a visual request.

17. The computer readable medium of claim 13, further comprising the step of:
   not executing a command corresponding to said first voice command or said first gesture command when said voice recognition score does not exceed a first threshold and said gesture recognition score does not exceed a second threshold.

18. A non-transitory computer readable medium comprising computer executable code which when executed by a computer performs the steps of:
   receiving a voice signal;
   receiving a gesture signal;
   performing a voice recognition procedure to generate a voice recognition (VR) score representing a likelihood that the voice signal corresponds to a first voice command;
   performing a gesture recognition procedure to generate a gesture recognition (GR) score representing a likelihood that the gesture signal corresponds to a first gesture command;
   generating a combined recognition score based on a combination of said VR score and said GR score; and
   executing a first command in a vehicle corresponding to at least one of said first voice command and said first gesture command when said combined recognition score exceed a first threshold.

19. The computer readable medium of claim 18, further comprising the step of:
   generating a confirmation request, prior to executing said first command, when said combined recognition score does not exceed a second threshold.

20. The computer readable medium of claim 18, wherein said confirmation request is at least one of an audible request and a visual request.

21. A system for executing a command in a vehicle comprising:
   a microphone positioned in the vehicle, for receiving a voice signal;
   a optical sensing device, positioned in the vehicle, for receiving a gesture signal;
   a processor for performing a voice recognition procedure to generate a voice recognition (VR) score representing a likelihood that the voice signal corresponds to a first voice command, the processor for performing a gesture recognition procedure to generate a gesture recognition (GR) score representing a likelihood that the gesture signal corresponds to a first gesture command; and
   an execution unit positioned in the vehicle, for executing a first command corresponding to said first voice command and first gesture command when said voice recognition score exceeds a first threshold and said gesture recognition score exceeds a second threshold.

22. The system of claim 21, further comprising:
   confirmation unit, for generating a confirmation request, prior to executing said first command, when either (a) said voice recognition score exceeds a first threshold and said gesture recognition score does not exceed a second threshold or (b) said voice recognition score does not exceed a first threshold and said gesture recognition score exceeds a second threshold.

* * * * *

UNITED STATES PATENT AND TRADEMARK OFFICE
CERTIFICATE OF CORRECTION

PATENT NO. : 8,744,645 B1
APPLICATION NO. : 13/777255
DATED : June 3, 2014
INVENTOR(S) : Pedram Vaghefinazari et al.

It is certified that error appears in the above-identified patent and that said Letters Patent is hereby corrected as shown below:

Title page, item (73), Assignee:

Applicants kindly request correction of assignee indicated on the cover of the patent from "Honda Motor Co., Ltd., Tokyo (JP)" to -- Honda Motor Co., Ltd., Tokyo (JP) and Edge3 Technologies, LLC, Phoenix (AZ) --.

Signed and Sealed this
Seventeenth Day of May, 2016

Michelle K. Lee
*Director of the United States Patent and Trademark Office*